J. KRIEGER.
DEVICE FOR DIMINISHING SLIDING FRICTION.
APPLICATION FILED FEB. 16, 1909.
945,128.
Patented Jan. 4, 1910.
2 SHEETS—SHEET 1.
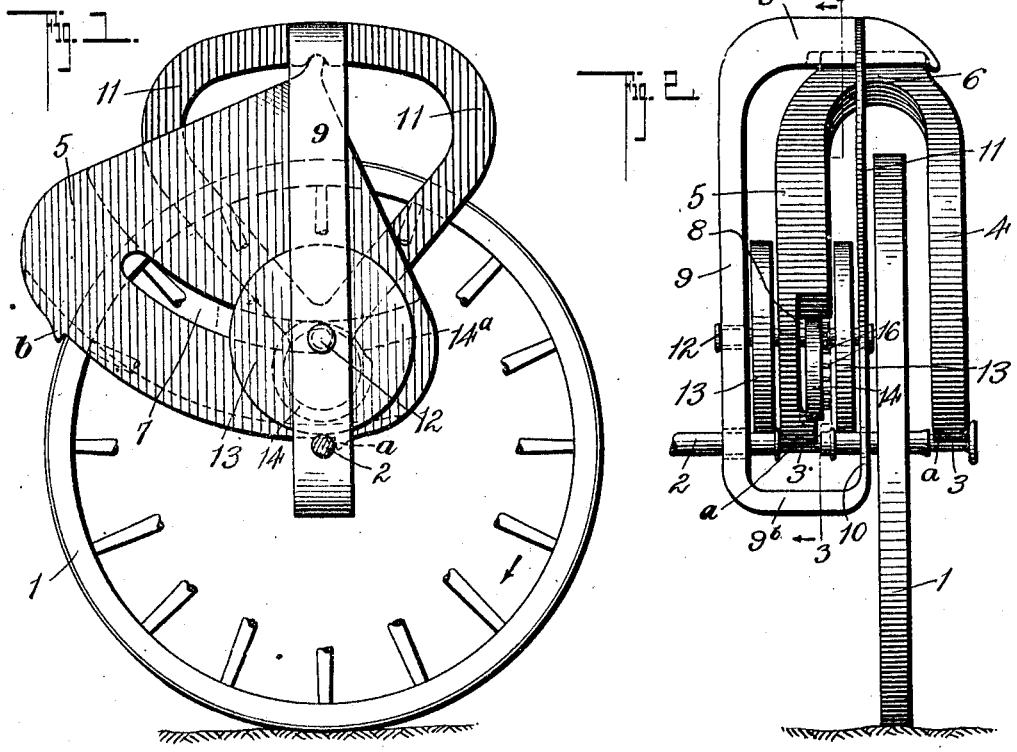
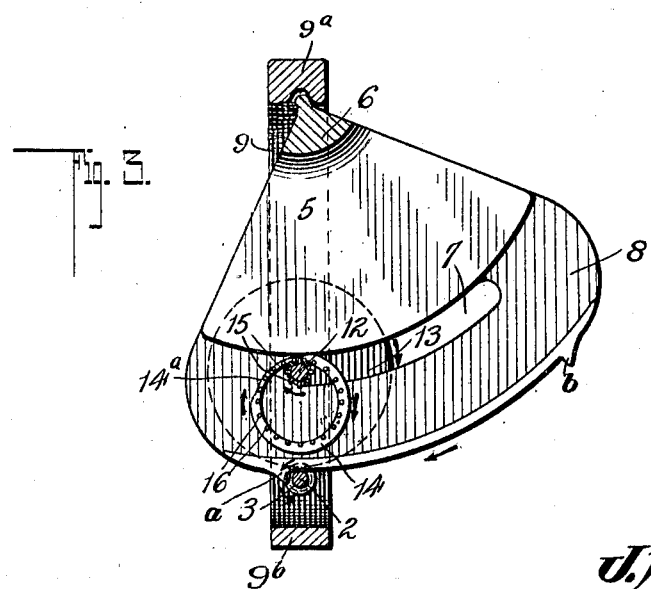

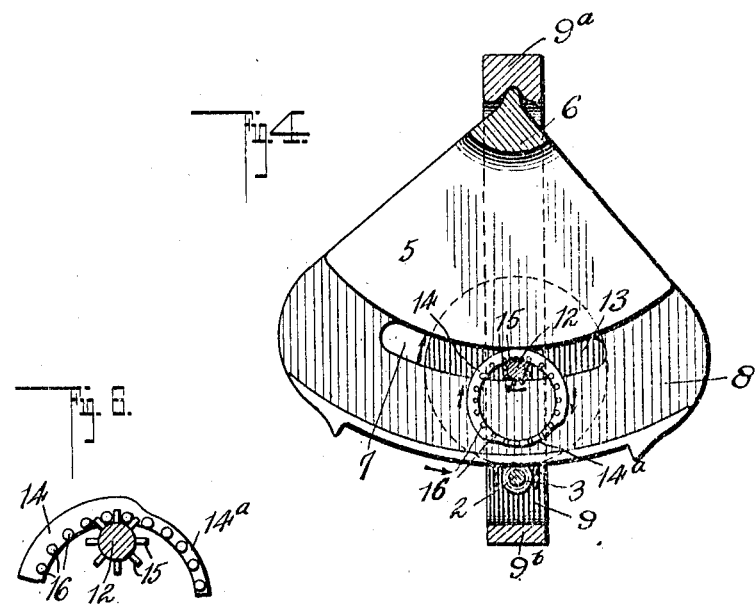
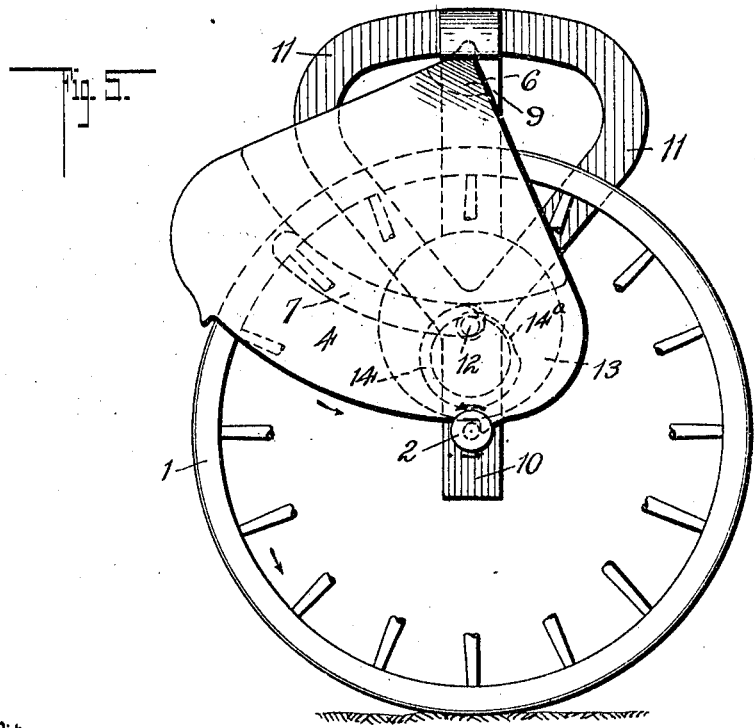

UNITED STATES PATENT OFFICE.

JOSEPH KRIEGER, OF TECHNY, ILLINOIS.

DEVICE FOR DIMINISHING SLIDING FRICTION.

945,128.   Specification of Letters Patent.   Patented Jan. 4, 1910.

Application filed February 16, 1909. Serial No. 478,170.

*To all whom it may concern:*

Be it known that I, JOSEPH KRIEGER, a subject of the Emperor of Germany, residing at Techny, in the county of Cook and State of Illinois, have invented a new and useful Improvement in Devices for Diminishing Sliding Friction, of which the following is a specification.

This invention relates to a device for diminishing friction in connection with vehicles, by throwing the load upon a part which is movable relative to the vehicle axle, and the movement of which is comparatively slow with respect to the rate of rotation of the axle, or of a wheel upon the axle.

It will be obvious that in the ordinary construction the weight is always carried by a bearing which is subject to a sliding friction in direct proportion to the rate of travel of the vehicle carrying the load. If the vehicle axle rotates this friction is in the bearings in which such axle turns, or if the axle is stationary it is between the wheel turning upon the axle and the axle itself. When the wheel turns upon the axle at a high rate of speed the bearings become heated owing to the friction developed between the moving and the stationary parts, and the friction between these parts tends to increase with the increase of speed. This has been partly overcome by the use of anti-friction balls, but owing to their small size, the relative movement of the various parts with respect to each other is still considerable when the vehicle is traveling at a high rate of speed.

The object of my invention is to interpose between the load and the axle a slowly moving element which slides transversely with respect to the axle, having practically a forward falling movement in the direction of travel of the vehicle, together with means for returning the said element to its normal position at the end of each periodic falling or rolling movement. By this means a sliding friction between the supporting wheels and the load carried thereby is almost entirely eliminated.

In the accompanying drawings: Figure 1 is a side elevation, the parts being shown at the commencement of one of the periodic sliding movements. Fig. 2 is an elevation at right angles to Fig. 1. Fig. 3 is a section on the line 3—3 of Fig. 2. Fig. 4 is a similar section showing the parts in the position occupied during a portion of the return movement, the weight being lifted from the axle. Fig. 5 is a side elevation, as seen from the opposite side of Fig. 1, the parts being shown in a position opposite to that of Fig. 1. Fig. 6 is a detail sectional view illustrating the mounting of a ring.

In these drawings 1 represents the wheel of a vehicle of any kind which is fixed upon a shaft 2, and this shaft has reduced portions 3 upon opposite sides of the wheel on which reduced portions slidably rest segmental plates 4 and 5, the upper portions of which are connected together by a yoke 6 which arches over the wheel 2. The segment 5 which is the inner segment, is longitudinally slotted as shown at 7 and the inner face of the segment adjacent to and upon the lower side and at the ends of the slot is recessed reducing the thickness of the segment throughout this portion. A vertically arranged plate 9, through which the axle 2 passes loosely, with room for a limited vertical movement projects forwardly at its upper end providing an arm $9^a$ which rests upon the top of the yoke 6 and this arm supports the weight of the vehicle and its load. The lower end of the plate 9 is bent toward the wheel 2 as shown at $9^b$ which forms a bracket which supports an integral standard 10 through which the axle 2 also loosely passes, and the upper portion of this standard is bifurcated and extends upwardly in the form of a heart-shaped bracket 11, the standard forming the apex of the lobes being connected to the arm $9^a$. As will be seen from the drawings the yoke 6 passes through this bracket 11.

It will now be obvious that the weight resting upon the arm $9^a$ is thrown upon the segment plates 4 and 5 which in turn rest slidably upon the axle 2. Upon rotation of the wheel 1 and the axle, the rotation of the latter will cause the segments to move across the axle and if no means were provided for stopping this movement, which resembles a forward falling movement, the segments would slide entirely off the axle. Each segment plate, however, is provided along its lower curved edge with projecting stop lugs $a$ and $b$. Assuming that the segment plates were in the position shown in Fig. 1 at the commencement of rotation of the wheel and that the wheel was rotated in the direction shown by the arrow in said figure, the segment will move forwardly, that is in the same direction in which the wheel is traveling until the lug $b$ strikes the axle 2, when such forward movement will cease. While the lug b would serve to stop the forward movement it is also necessary to provide means for automatically returning the segments to their original positions without stopping, or changing the direction of rotation of the wheel. Mounted in the plate 9 and the standard 10 is a shaft 12 upon which is mounted wheels 13, said wheels being upon opposite sides of the segment 5, and these wheels bear upon the axle 2 and are rotated by it. These wheels support the plate 9 and the standard and prevent said plate and standard from bearing directly upon the axle at the point where the axle passes loosely through the plate and standard. Upon the shaft 12 is hung a ring 14 which ring rests in the recess 8 of the segment 5, the upper curved wall of said recess, which wall is continuous with the upper edge of the slot 7, bearing upon said ring. In order to insure travel of the ring about the shaft 12, pins 15 are carried by the shaft and engage pins 16 carried by the ring. It will also be noted that while the interior of the ring is a circle its exterior circumference is in the form of a cam due to reducing in thickness a portion 14ª of the ring. This ring is of such a degree of thickness that when the segment is bearing upon the thick portion of the ring, the segments are lifted clear of the axle 2. But when the thin portion of the ring is brought to the top, that is into engagement with the shaft 12 upon which the ring hangs, the segmental plates are lowered and rest upon the axle 2.

It will be noted that the thin portion of the ring is less than half the circumference, the proportions of the thin and thick portions being regulated by the difference in rate of speed between the axle 2 and the shaft 12. It will be obvious that the axle 2 will have a rapid rotation, whereas the axle 12 being regulated by engagement of the wheels 13, which wheels have a diameter many times that of the axle, will give the shaft 12 a comparatively slow rate of speed, and this in turn will give even a slower rotation to the ring, and the thin portion of the ring will travel over the shaft 12 during the time that the segment 5 slides across the axle from a to b. It will now be obvious that when the segments have reached a position where the thick portion of the ring will come into engagement with the upper wall of the recess 8 the segments will be lifted from the axle. The segments are now resting upon the rotating ring and by reason of rotation of the ring, the segments will be carried back, as shown in Fig. 4 to their original positions, when the thin portion of the ring will again reach the shaft 12 and the segments will again be lowered to the axle. It will now be obvious that the weight of the load is carried by the segments, and is successively thrown directly upon the axle 2 and upon the ring 14 and shaft 12, but at all times there is interposed between the axle 2 and the load a slow sliding movement, thereby eliminating the sliding friction found in ordinary bearings.

What I claim is:—

1. In a device of the kind described, load supporting means resting freely upon a rotatable axle and having a falling forward movement, means for checking said movement, and means for returning the load supporting means to its original position.

2. The combination with an axle, of a segment resting loosely on and moving transversely with respect to said axle, and means for returning said segment to its original position, said means including a ring having a reduced portion.

3. A device of the kind described comprising a rotatable axle, a recessed segment resting loosely across said axle and movable by rotation of the axle, a rotatable shaft, and a ring resting in the recess of the segment and hung upon said shaft, the said ring having thick and thin portions, the thick portion of the ring engaging the segment and lifting the same free of the axle for the purpose of returning the segment to its original position.

4. A device of the kind described comprising a rotatable axle, a shaft parallel to and rotated from the axle, a slotted segment resting freely on the axle, a shaft passing through the slot, a face of the segment being recessed, a ring hung loosely upon said shaft, and turning about it, said ring working between the shaft and the upper wall of the recess, the ring having portions of different thickness, as and for the purpose set forth.

5. A device of the kind described comprising an axle, a shaft journaled above and parallel to said axle, a wheel fixed upon said shaft and engaging the axle, a slotted segment, a shaft passing through the slot of the segment, the segment normally resting upon the axle, and means carried by the shaft for engaging the segment and lifting the same clear of the shaft for the purpose of returning it to normal position, said segment having been shifted from normal position by rotation of the axle.

6. A device of the kind described comprising a rotatable axle, a wheel fixed thereon, segments resting loosely upon the axle upon opposite sides of the wheel, the segments being connected above the wheel, one of said segments being slotted and recessed, means for supporting a shaft parallel to and above the axle, the shaft passing through the slot of the segment, wheels carried by said shaft, said wheels being upon opposite sides of the slotted segment, the wheels resting upon the axle and being rotated therefrom, and a ring having different degrees of thickness, said ring being hung upon the shaft and turning about said shaft, the ring resting in the recess of the segment, the thick portion of the ring engaging the upper wall of the recess, and transferring the weight of the segments from the axle to the shaft at a pre-determined time, as and for the purpose set forth.

JOSEPH KRIEGER.

Witnesses:
W. JOS. MEYER,
FREDRICK JUNG.